United States Patent
Croxford (10) Patent No.: US 11,301,728 B2
(45) Date of Patent: Apr. 12, 2022

(54) IMAGE PROCESSING USING A NEURAL NETWORK SYSTEM

(71) Applicant: Apical Ltd, Cambridge (GB)

(72) Inventor: Daren Croxford, Swaffham Prior (GB)

(73) Assignee: Apical Ltd., Cambridge (GB)

( * ) Notice: Subject to any disclaimer, the term of this patent is extended or adjusted under 35 U.S.C. 154(b) by 193 days.

(21) Appl. No.: 16/011,100

(22) Filed: Jun. 18, 2018

(65) Prior Publication Data
US 2019/0385024 A1    Dec. 19, 2019

(51) Int. Cl.
G06K 9/62 (2006.01)
G06K 9/46 (2006.01)
G06N 3/04 (2006.01)

(52) U.S. Cl.
CPC ............. *G06K 9/6277* (2013.01); *G06K 9/46* (2013.01); *G06K 9/6256* (2013.01); *G06N 3/04* (2013.01)

(58) Field of Classification Search
None
See application file for complete search history.

(56) References Cited

U.S. PATENT DOCUMENTS

| | | | | |
|---|---|---|---|---|
| 7,584,475 B1* | 9/2009 | Lightstone | ................ | G06F 9/50 |
| | | | | 348/14.01 |
| 9,753,773 B1* | 9/2017 | Borlick | ................ | G06F 9/5094 |
| 2017/0317983 A1* | 11/2017 | Kompalli | ............ | G06F 21/6209 |
| 2018/0157938 A1* | 6/2018 | Wang | ....................... | G06K 9/66 |
| 2018/0247107 A1* | 8/2018 | Murthy | ............. | G06K 9/00147 |

* cited by examiner

*Primary Examiner* — Vikkram Bali
(74) *Attorney, Agent, or Firm* — EIP US LLP (57) ABSTRACT

A method of processing image data representative of at least part of an image using a computing system to detect at least one class of object in the image. The method comprises processing the image data using a neural network system selected from a plurality of neural network systems including a first neural network system arranged to detect a class of objects, and a second neural network system arranged to detect the class of objects. The first neural network system comprises a first plurality of layers and the second neural network system comprises a second plurality of layers. The second neural network system has at least one of: more layers than the first neural network system; more neurons than the first neural network system; and more interconnections between neurons than the first neural network system. The method comprises obtaining a trigger and, on the basis of the trigger, processing the image data using a selected one of the first and second neural network systems.

19 Claims, 5 Drawing Sheets

IMAGE PROCESSING USING A NEURAL NETWORK SYSTEM

BACKGROUND OF THE INVENTION

Technical Field

The present invention relates to methods and apparatus for processing image data representative of image frames.

Background

Methods to process image data, for example to detect characteristics of an image such as features or objects in the image, may be computationally intensive. There is thus a need for more efficient methods of detecting characteristics of images.

SUMMARY

According to a first aspect of the present disclosure, there is provided a method of processing image data representative of at least part of an image using a computing system to detect at least one class of object in the image, the method comprising processing the image data using a neural network system selected from a plurality of neural network systems including: a first neural network system arranged to detect a class of objects, the first neural network system comprising a first plurality of layers; and a second neural network system arranged to detect the class of objects, the second neural network system comprising a second plurality of layers, wherein the second neural network system has at least one of: more layers than the first neural network system; more neurons than the first neural network system; and more interconnections between neurons than the first neural network system, and wherein the method comprises: obtaining a trigger; and on the basis of the trigger, processing the image data using a selected one of the first and second neural network systems.

According to a second aspect of the present disclosure, there is provided an image processing system comprising: at least one processor; storage accessible by the at least one processor, the storage configured to store image data representative of at least part of an image; wherein the at least one processor is configured to implement a plurality of neural network systems including: a first neural network system arranged to detect a class of objects and comprising a first plurality of layers; and wherein the second neural network system has at least one of: more layers than the first neural network system; more neurons than the first neural network system; and more interconnections between neurons than the first neural network system; the image processing system comprising a controller configured to: obtain a trigger; and on the basis of the trigger, cause the at least one processor to process the image data using a selected one of the first and second neural network systems.

Further features and advantages will become apparent from the following description of examples which is made with reference to the accompanying drawings.

DETAILED DESCRIPTION OF CERTAIN INVENTIVE EMBODIMENTS

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Methods described herein relate to processing image data representative of at least part of an image using a computing system. The image data is processed using the computing system to detect at least one class of object in the image. The method involves processing the image data using a neural network system selected from a plurality of neural network systems. The plurality of neural network systems include a first neural network system and a second neural network system, both of which are arranged to detect a particular class of objects. Thus, the first and second neural network systems (or "neural networks") may each be considered to be, or form part of, an object detection system. An object detection system, for example, allows objects belonging to a particular class of objects to be detected in the image. For example, where the class is human faces, the object detection system may be used to detect the presence of a human face in the image. In some cases, an object detection system allows particular instances of the object to be identified. For example, the instance may be a particular human face. In this example, the object detection system may therefore be used to identify that a detected human face is the particular human face the object detection system is arranged to identify.

A neural network typically includes a number of interconnected nodes, which may be referred to as artificial neurons, or neurons. The internal state of a neuron (sometimes referred to as an "activation" of the neuron) typically depends on an input received by the neuron. The output of the neuron then depends on the input, weight, bias, and the activation function. The output of some neurons is connected to the input of other neurons, forming a directed, weighted graph in which vertices (corresponding to neurons) or edges (corresponding to connections) of the graph are associated with weights, respectively. The neurons may be arranged in layers such that information may flow from a given neuron in one layer to one or more neurons in a successive layer of the neural network. Examples of neural network architecture are described in more detail further below.

Figure 1:
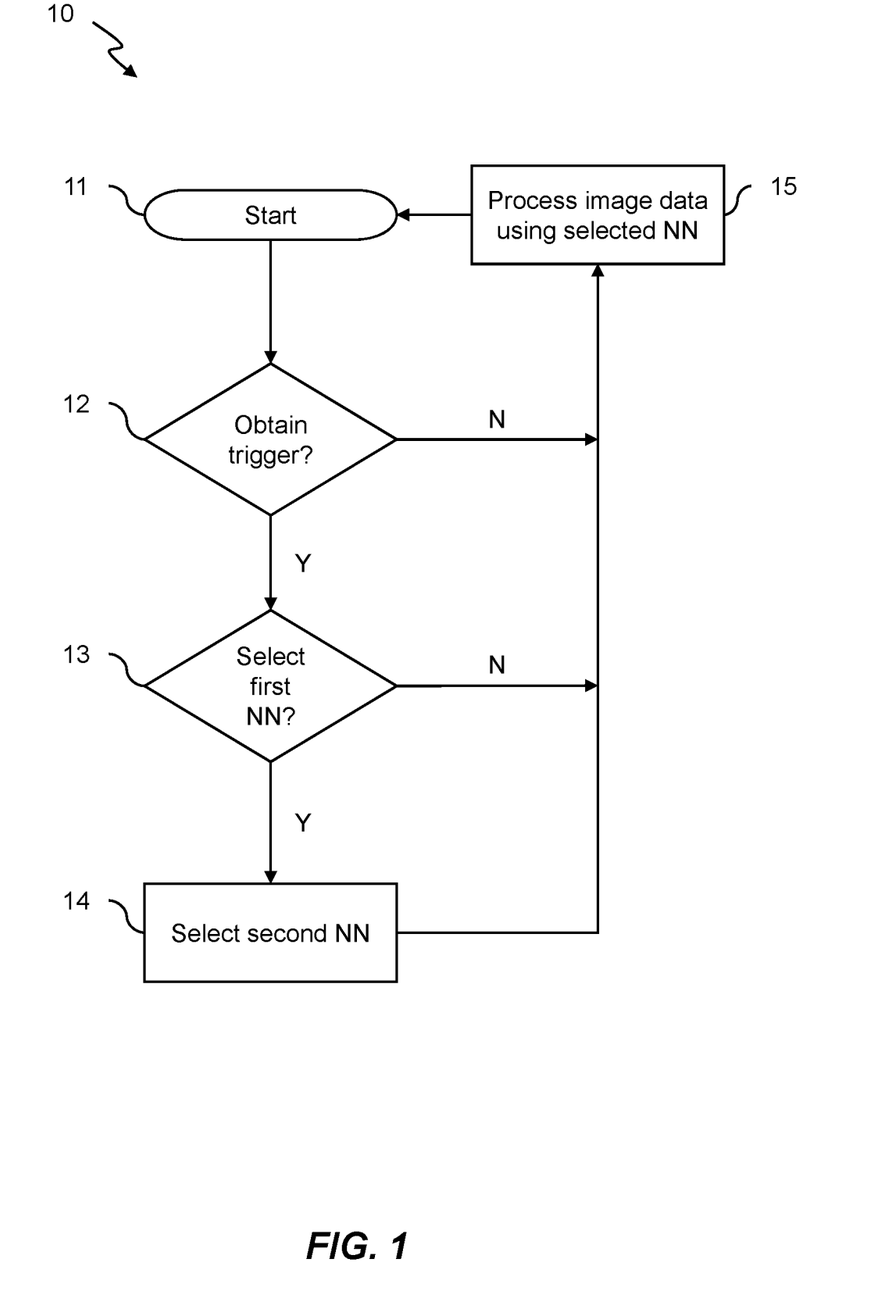
FIG. 1 shows a flow diagram illustrating a method of processing image data according to examples.

FIG. 1 shows a flow diagram illustrating a method 10 of processing image data according to examples. The method 10 starts at item 11, for example whereat the image data, representative of at least part of an image, is obtained. At item 12, a trigger is obtained. Examples of the trigger are described below. On the basis of the trigger, the image data is processed using a selected one of the first (item 13) and second (item 14) neural networks. Before either neural network has been selected to process the image data, the trigger may be a 'selection' trigger such that, at item 12, the trigger determines which neural network will be used first. Thereafter, the trigger may be a 'reselection' trigger such that, on obtainment of a further trigger, and on the basis thereof, further image data is processed using a different selected neural network. However, if the further trigger is not obtained at item 12, said further image data is processed using the previously selected neural network.

Figure 2:
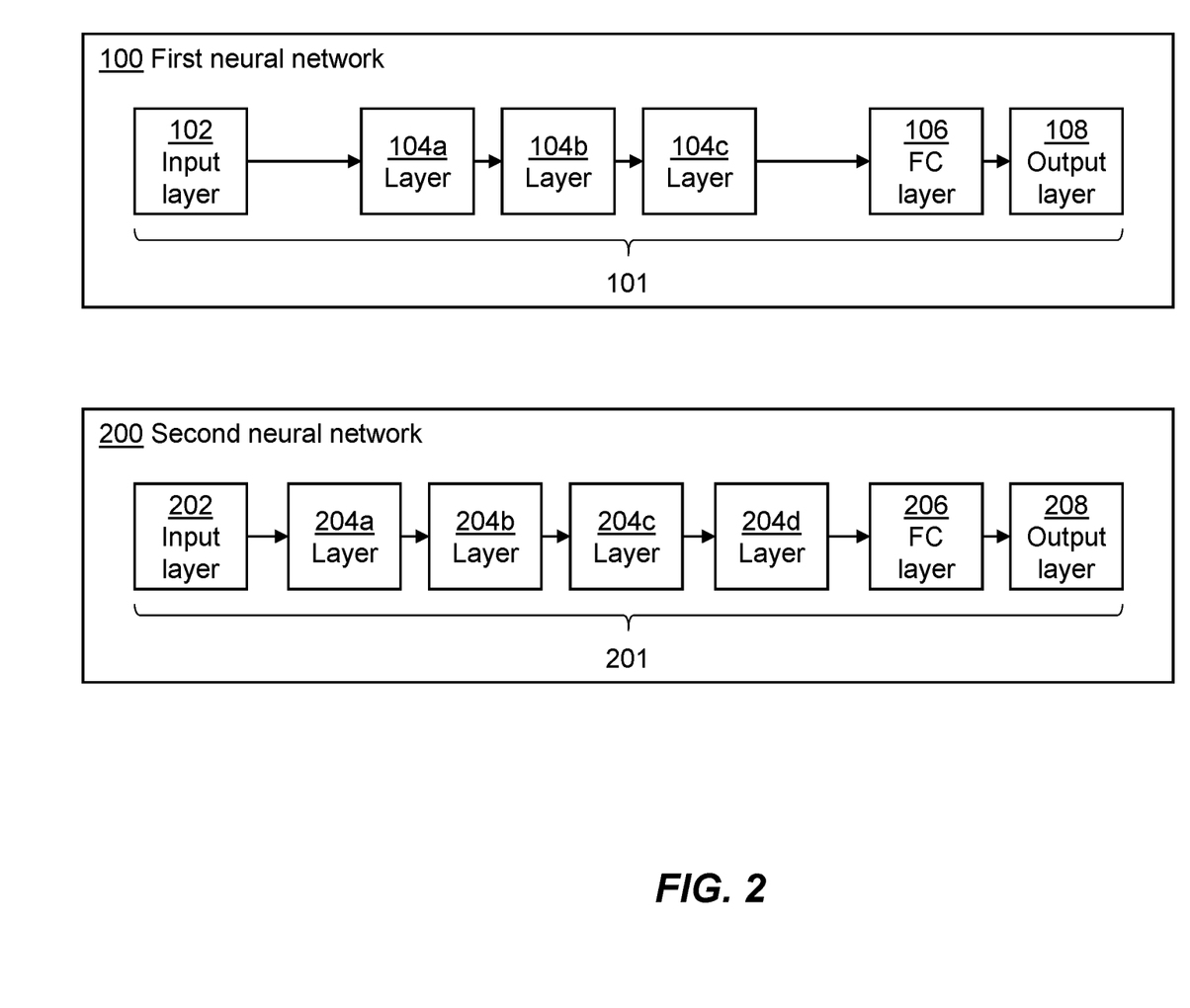
FIGS. 2 to 4 schematically show a first neural network system and a second neural network system according to examples.

FIG. 2 schematically shows the first neural network system 100 and the second neural network system 200 according to examples. The first neural network system 100 comprises a first plurality of layers 101 and the second neural network system 200 comprises a second plurality of layers 201. The second neural network system 200 has more layers than the first neural network system 100. In other examples, the second neural network system 200 additionally or alternatively has more neurons and/or more interconnections between neurons than the first neural network system 100.

In FIG. 2, the first neural network 100 is a convolutional neural network (CNN). An example of a CNN is the VGG-16 CNN, although other CNNs may be used instead. A typical CNN includes an input layer 102, a plurality of convolutional layers (three of which, 104a, 104b, 104c, are shown in FIG. 2), at least one fully connected layer (one of which, 106, is shown in FIG. 2) and an output layer 108. The input layer 102 for example corresponds with an input to the first neural network 100, which in this example is image data. The image data is for example 224 pixels wide and 224 pixels high and includes 3 color channels (such as a red, green and blue color channel). The convolutional layers typically extract particular features from the input data, to create feature maps. The fully connected layers then use the feature maps for classification.

In examples in accordance with FIG. 2, the output of the layer 104a undergoes pooling before it is input to the layer 104b. Pooling for example allows values for a region of an image or a feature map to be aggregated or combined, for example by taking the highest value within a region. For example, with 2×2 max pooling, the highest value of the output of the layer 104a within a 2×2 patch of the feature map output from the layer 104a is used as an input to the 104b, rather than transferring the entire output of the layer 104a to the layer 104b. This reduces the amount of computation for subsequent layers of the first neural network 100. Further pooling may be performed between other layers of the first neural network 100. Conversely, pooling may be omitted in some cases. It is to be appreciated that the first neural network 100 and the second neural network 200 of FIG. 2 (described further below) have been greatly simplified for ease of illustration and that typical neural networks may be significantly more complex.

In general, neural network systems such as the first neural network 100 of FIG. 2 may undergo what is referred to as a "training phase", in which the neural network is trained for a particular purpose. As described, a neural network typically includes a number of interconnected neurons forming a directed, weighted graph in which vertices (corresponding to neurons) or edges (corresponding to connections) of the graph are associated with weights, respectively. The weights may be adjusted throughout training, altering the output of individual neurons and hence of the neural network as a whole. In a CNN, a fully connected layer typically connects every neuron in one layer to every neuron in another layer, and may therefore be used to identify overall characteristics of an image, such as whether the image includes an object of a particular class, or a particular instance belonging to the particular class.

In the example of FIG. 2, the first neural network 100 has been trained to perform object detection by processing image data, for example to determine whether an object of a predetermined class of objects is present in the image represented by the image data (although in other examples the first neural network 100 may have been trained to identify other image characteristics of the image instead). Training the first neural network 100 in this way for example generates one or more kernels associated with at least some of the layers (such as layers of the first neural network 100 other than the input layer 102 and the output layer 108). Hence, the output of the training may be a plurality of kernels associated with a predetermined neural network architecture (for example with different kernels being associated with different respective layers of a multi-layer neural network architecture). The kernel data may be considered to correspond to weight data representative of weights to be applied to image data, as each element of a kernel may be considered to correspond to a weight, respectively. Each of these weights may be multiplied by a corresponding pixel value of an image patch, to convolve the kernel with the image patch as described below.

The kernels may allow features of an image to be identified. For example, some of the kernels may be used to identify edges in the image represented by the image data and others may be used to identify horizontal or vertical features in the image (although this is not limiting, and other kernels are possible). The precise features that the kernels identify may depend on the image characteristics, such as the class of objects, that the first neural network 100 is trained to detect. The kernels may be of any size. As an example, each kernel may be a 3×3 matrix, which may be convolved with the image data with a stride of 1. The kernels may be convolved with an image patch (or a feature map obtained by convolution of a kernel with an image patch) to identify the feature the kernel is designed to detect. Convolution generally involves multiplying each pixel of an image patch (in this example a 3×3 image patch), or each element of a feature map, by a weight in the kernel before adding the result of this operation to the result of the same operation applied to neighboring pixels or neighboring feature map elements. A stride for example refers to the number of pixels or feature map elements a kernel is moved by between each operation. A stride of 1 therefore indicates that, after calculating the convolution for a given 3×3 image patch, the kernel is slid across the image by 1 pixel and the convolution is calculated for a subsequent image patch. This process may be repeated until the kernel has been convolved with the entirety of the image (or the entire portion of the image for which a convolution is to be calculated), or with the entirety of a feature map the kernel is to be convolved with. A kernel may sometimes be referred to as a filter kernel or a filter. A convolution generally involves a multiplication operation and an addition operation (sometimes referred to as a multiply accumulate operation). Thus, a processor or neural network accelerator configured to implement a neural network, such as that of FIG. 5, may include a multiplier-accumulator (MAC) unit configured to perform these operations.

After the training phase, the first neural network 100 (which may be referred to as a trained first neural network 100) may be used to detect the presence of objects of a predetermined class of objects in input images. This process may be referred to as "classification" or "inference". Classification typically involves convolution of the kernels obtained during the training phase with image patches of the image input to the first neural network 100 to generate a feature map. The feature map may then be processed using at least one fully connected layer to classify the image.

In the example of FIG. 2, the layer 104a involves the convolution of 64 different kernels with the image data of the input layer 102. Each of the 64 kernels is, for example, arranged to identify a different respective feature of the image data. In an illustrative example in which the image data is 224×224 pixels in size, with 3 color channels, and is convolved with 64 kernels of a size of 3×3 pixels, the layer 104a of the first neural network 100 involves 224×224×3× (3×3)×64 multiply-accumulate operations, i.e. 86 million multiply-accumulate operations. There will also be a large number of further multiply-accumulate operations associated with each of the further layers 104b, 104c, 106 of the first neural network 100. As will be appreciated, though, other neural networks may involve convolutions with a different number of kernels. Nevertheless, processing an image to identify an image characteristic such as the presence of an object of a predetermined class, or a particular instance of the object, typically involves a large number of data processing operations, each of which consumes power.

In the example of FIG. 2, image data received by the input layer 102 of the first neural network 100 is processed using layers 104a, 104b, 104c to generate feature data. The image data may represent at least one characteristic of the light captured by an image sensor, such as an intensity of the light captured by each sensor pixel, which may be proportional to the number of photons captured by that sensor pixel. The intensity may represent a luminance of the captured light, which is for example a measure of the intensity of light per unit area rather than an absolute intensity. In other examples, the image data may be representative of a brightness of captured light, which may be considered to correspond to a perception of a luminance, which may or may not be proportional to the luminance. In general, the image data may represent any photometric quantity or characteristic that may be used to represent the visual appearance of the image represented by the image data, or may be derived from any such photometric quantity or characteristic. The image data may be in any suitable format, such as a raw image format. For example, the image data may be streamed from the image sensor, with or without being saved to a framebuffer, without saving the raw image data to memory. In such cases, image data obtained after processing of the raw image data may, however, be written to memory.

In this example, the layers 104a, 104b, 104c of the first neural network 100 may be used to generate feature data representative of at least one feature of the image. The feature data may represent an output feature map, which may be output from a convolutional layer of a CNN such as the first neural network 100 of FIG. 2. There may be more or fewer layers in the first neural network 100 than those shown in FIG. 2. In examples in which the first neural network 100 includes a plurality of layers 104a, 104b, 104c between the input layer 102 and the fully connected layer 106 and/or the output layer 108, as shown in FIG. 2, each of the said plurality of layers 104a, 104b, 104c may be used to generate intermediate feature data representative of at least one feature of the image. The intermediate feature data output from one of the layers (e.g. layer 104a) may be input to a subsequent layer of the first neural network 100 (e.g. layer 104b) to identify further features of the image represented by the image data input to the first neural network 100.

Although not shown in FIG. 2, it is to be appreciated that further processing may be applied to the image data after it has been obtained by an image sensor and before it is processed by the layers of the first neural network 100. Said further processing may be performed by other components of an image processing system or as part of the first neural network 100 itself.

In examples in which the first neural network 100 is a CNN, as in FIG. 2, at least one layer of the first neural network 100 (in this example, each of the layers 104a, 104b, 104c) may be a convolutional layer, respectively. The first neural network 100 also includes a fully connected layer 106, which in FIG. 2 is arranged to receive output feature data from the convolutional layer 104c, which for example represents an output feature map, and to process the output feature data to generate object data. The object data for example corresponds with the output layer 108 of the first neural network 100. The object data generated by the fully connected layer 106 may provide an indication of whether the first neural network 100 has detected the presence of an object of a predetermined class in the image represented by the image data. In FIG. 2, the first neural network 100 includes solely one fully connected layer 106. However, in other examples, the first neural network 100 may include a plurality of fully connected layers, with an output of one of the fully connected layers being received as an input by a subsequent fully connected layer.

FIG. 2 shows an example second neural network 200 of the plurality of neural network systems. The second neural network 200 includes a second plurality of layers 201. The second neural network system 200 has more layers than the first neural network 100. The second neural network 200 may thus be said to be more complex than the first neural network 100. In other examples, the increased complexity of the second neural network 200 relative to the first neural network 100 may be due to the second neural network system 200 additionally or alternatively having more neurons and/or more interconnections between neurons than the first neural network system 100.

Similarly to the first neural network 100, the second neural network 200 includes an input layer 202, e.g. which corresponds with an input to the second neural network 200, which in this example is image data. The second neural network 200 also includes an output layer 208, e.g. which corresponds to object data providing an indication of whether the second neural network 200 has detected the presence of an object of a predetermined class in the image represented by the image data. The second neural network 200 includes layers 204a, 204b, 204c, 204d which process the image data received by the input layer 202 to generate feature data, similarly to the layers 104a, 104b, 104c of the first neural network 100 described above. The corresponding description thereof applies accordingly. In the example of FIG. 2, the second neural network 200 is also a CNN and the layers 204a, 204b, 204c, 204d are also convolutional layers.

The second neural network 200 also includes a fully connected layer 206, which in FIG. 2 is arranged to receive output feature data from the convolutional layer 204d, which for example represents an output feature map, and to process the output feature data to generate the object data corresponding to the output layer 208. In FIG. 2, the second neural network 200 includes solely one fully connected layer 206. However, in other examples, the second neural network 200 may include a plurality of fully connected layers, with an output of one of the fully connected layers being received as an input by a subsequent fully connected layer. Thus, in the example of FIG. 2, the second neural network 200 includes only one more layer than the first neural network 100. However, in other examples, the second neural network 200 may comprise more than one additional layer compared to the first neural network 100. In this example, the additional layer is in the set of convolutional layers 204, wherein the second neural network 200 includes four such layers 204a, 204b, 204c, 204d, whereas the first neural network 100 includes three convolutional layers 104a, 104b, 104c. Both first and second neural networks 100, 200 include only one fully connected layer 106, 206 respectively. In other examples, the second neural network 200 may additionally or alternatively include more fully connected layers 206 than the first neural network 100. For example, in particular cases, the first and second neural networks 100, 200 may each include a same number of convolutional layers 104, 204, but the second neural network may include more fully connected layers 206 than the first neural network 100.

As described above with reference to FIG. 1, methods described herein involve obtaining a trigger and, on the basis of the trigger, processing the image data using a selected one of the first and second neural network systems 100, 200. In some examples there are more neural network systems in the plurality of neural network systems, e.g. in addition to the first and second neural network systems 100, 200.

Using a selected neural network system of the plurality of neural network systems on the basis of a given trigger allows the processing of the image data to be adapted in response to particular circumstances, e.g. relating to the computing system used to perform the image processing. For example, the trigger may comprise an indication that a value representative of an availability of a system resource of the computing system has a predetermined relationship with a respective predetermined threshold value for the system resource. The predetermined relationship may include the system resource availability being less than, less than or equal to, equal to, greater than or equal to, or greater than the threshold value. As an example, the trigger may comprise an indication that an availability of a system resource, e.g. an amount of processor usage available to the computing system, is below a predetermined threshold value. Based on this trigger, the image data may be processed using a selected one of the first and second neural network systems 100, 200. For example, the first neural network 100 may be selected to process the image data based on the trigger. The first neural network 100, having fewer layers than the second neural network 200, may involve less processor usage when being used to process the image data compared to the second neural network 200, and so may be selected when the trigger (indicating that the amount of processor usage available is below the predetermined threshold) is obtained.

Other examples of the availability of the system resource include: a state of charge of an electric battery configured to power the computing system; an amount of available storage accessible by the computing system; an amount of electrical power available to the computing system; and an amount of bandwidth available to at least one processor configured to implement at least one of the first and second neural network systems. For example, the computing system may comprise the at least one processor. The computing system may comprise additional components, in examples. The computing system may have a limited bandwidth, e.g. a maximum amount of data that can be transmitted by the computing system in a fixed amount of time. The amount of bandwidth available to the at least one processor configured to implement at least one of the first and second neural network systems may thus be limited, and may vary, in examples. For example, if other components of the computing system are active, less bandwidth may be available to the at least one processor.

In examples, the trigger comprises an indication that a value representative of a temperature of the computing system has a predetermined relationship with a respective predetermined threshold temperature value. Similarly to the examples described above, the predetermined relationship may include the temperature of the computing system being less than, less than or equal to, equal to, greater than or equal to, or greater than the threshold value. The temperature of the computing system may be monitored using a temperature sensor located on or within the computing system, for example. In some cases, the temperature of the computing system comprises a temperature of a processor of the computing system, e.g. the processor arranged to implement at least one of the plurality of neural networks.

In examples, the trigger comprises an indication that a value representative of a latency of generating object data, by a neural network system selected from the plurality of neural network systems, has a predetermined relationship with a respective predetermined threshold latency value. For example, the latency may correspond to a time delay between the selected neural network system receiving an input, e.g. image data, and generating object data, e.g. indicative of whether a given image includes an object of the class of objects, as output. The latency of outputs by the selected neural network system may be monitored, e.g. to determine a set of latency values. On determining that the latency, e.g. a given latency value, has the predetermined relationship with, e.g. is greater than, the threshold value, an indication thereof may trigger the processing of further image data using a selected one of the first and second neural network systems 100, 200.

In examples, one of the first or second neural network systems 100, 200 may process a series of image data respectively representative of a plurality, e.g. series, of different images. Object data may be generated based on each image using said one of the first or second neural network systems 100, 200 as described above, each instance of object data forming a set of object data. In such examples, the latency may correspond to a time delay between successive outputs of object data, each outputted instance of object data indicative of whether a given image includes an object of the class of objects, may be monitored, e.g. to determine a set of latency values. On determining that the latency, e.g. a given latency value, has the predetermined relationship with the threshold value, an indication thereof may trigger the processing of image data obtained subsequently to the series of image data using a selected one of the first and second neural network systems 100, 200.

In examples, prior to the processing of the image data using the selected one of the first and second neural network systems 100, 200, a value of a detection performance characteristic is determined for the selected one of the first and second neural network systems 100, 200. On the basis of the detection performance characteristic value having a predetermined relationship with a predetermined threshold value, the image data may then be processed using the selected one of the first and second neural network systems.

The detection performance characteristic may correspond to a probability, determined by the selected one of the first and second neural network systems 100, 200 based on image data representative of a predetermined image, that the predetermined image comprises an object belonging to a predetermined class of objects. The predetermined image may be a "known" image that includes an object belonging to the predetermined class, e.g. a cat. The selected one of the first and second neural networks 100, 200 may be arranged to detect the class of objects, e.g. cats, in images. Thus, the image data representative of the predetermined image may be processed by the selected one of the first and second neural networks 100, 200 to determine a probability that the predetermined image includes a cat, for example. The object data, e.g. corresponding to the respective output layer 108, 208 of the selected neural network 100, 200, may include the probability determined by the selected neural network 100, 200. For example, on the basis of the trigger, the first neural network 100 may be selected to process the image data in accordance with examples described herein. Prior to such image processing, a value of a detection performance characteristic, determined for the first neural network system 100, may be compared to a predetermined threshold value. On the basis of the detection performance characteristic value having a predetermined relationship with the predetermined threshold value, the image data is proceeded to be processed using the first neural network system 100. As an example, the first neural network 100 may determine a probability that the predetermined image includes a cat of 0.80, for example, which may be compared to a predetermined threshold value, e.g. 0.70. The predetermined relationship may include the detection performance characteristic value being less than, less than or equal to, equal to, greater than or equal to, or greater than the threshold value. In this example, the image data is proceeded to be processed by the first neural network 100 based on the determined detection performance characteristic value of 0.80 being greater than the threshold value of 0.70.

In some cases, image data is processed using a selected one of the plurality of neural network systems, as described, and a further trigger is obtained. On the basis of the further trigger, processing of further image data is switched to a different selected one of the plurality of neural network systems. For example, returning to the example above in which one of the first or second neural network systems 100, 200 processes a series of image data, the further trigger may comprise an indication that the latency has the predetermined relationship with, e.g. is greater than, the threshold value. On the basis of the further trigger, subsequent processing of image data is performed using a different selected one of the plurality of neural network systems.

In examples, the further trigger comprises an indication that a difference between first and second values of a detection performance characteristic, determined respectively for the first and second neural network systems 100, 200, has a predetermined relationship with a predetermined threshold value. For example, the detection performance characteristic, determined for a given neural network system, may correspond to a probability that a predetermined image comprises an object belonging to a predetermined class of objects, the probability being determined by the given neural network based on image data representative of the predetermined image. The predetermined image may be a "known" image that includes an object belonging to the predetermined class, e.g. a cat. Each of the first and second neural networks 100, 200 may be arranged to detect the class of objects, e.g. cats, in images. Thus, the image data representative of the predetermined image may be processed by both first and second neural networks 100, 200 with each neural network 100, 200 determining a respective probability that the predetermined image includes a cat, for example. The object data, e.g. corresponding to the respective output layers 108, 208 of the neural networks 100, 200, may respectively include the probabilities determined by the first and second neural networks 100, 200. A difference between the determined probabilities may be determined, e.g. the first neural network 100 may determine a first probability that the predetermined image includes a cat of 0.80, and the second neural network may determine a second probability that the predetermined image includes a cat of 0.95, giving a difference between the determined probabilities of 0.15. In an example, the difference of 0.15 being greater than a predetermined threshold of 0.10 may trigger the processing of image data to be done using a different selected one of the plurality of neural network systems. In examples, respective values of the classification performance characteristic for the first and second neural network systems 100, 200 may thus be periodically determined and compared.

A difference between detection performance characteristic values, determined respectively for the first and second neural network systems 100, 200, having the predetermined relationship with the threshold may indicate that the first and second neural networks 100, 200 are able to detect the class of objects comparably, e.g. within a tolerance. Thus, in certain cases, this may trigger the first neural network 100 to be used to process subsequent image data, e.g. because the first neural network 100 consumes less system resources than the second neural network 200, and yet can detect the class of objects to a substantially similar degree of accuracy as the second neural network 200.

In some examples, the predetermined image may include multiple objects, e.g. belonging to different classes of objects. In such cases, the detection performance characteristic may correspond to a set of probability values, each value in the set corresponding to a probability, as determined by the respective neural network, that the predetermined image comprises a corresponding object belonging to a particular class of objects. For example, a detection performance characteristic value determined for a given neural network may comprise a data structure, e.g. an array, containing probabilities corresponding to different object classes. As an example, the predetermined image may include an object belonging to a 'cat' class of objects, and another object belonging to a 'car' class of objects. By processing the predetermined image, the first neural network may determine corresponding probabilities of dog=0.80; cat=0.75; car=0.85. The first detection performance characteristic value may therefore be [0.80, 0.75, 0.85]. Similarly, the second neural network may determine probabilities of dog=0.75; cat=0.80; car=0.85 giving a second performance characteristic value of [0.75, 0.80, 0.85]. A difference between the first and second detection performance characteristic values, e.g. a "difference array", may thus be determined to be [−0.05, 0.05, 0]. In some cases, the threshold may also comprise an array, such that corresponding components of the determined difference array can be compared to corresponding components of the threshold array. For example, a predetermined threshold array of [0.10, 0.10, 0.10] may mean that the difference between the first and second detection performance characteristic values is below the threshold since each component of the difference array (or a magnitude thereof) is less than the corresponding component in the threshold array. In other cases, a magnitude of the difference array may be determined and compared to a threshold magnitude, e.g. a predetermined threshold magnitude value or a magnitude of the predetermined threshold array.

In addition, or alternatively, to comparing the first and second detection performance characteristic values (determined respectively for the first and second neural network systems 100, 200) to each other, e.g. to determine an absolute difference between them, the first and second detection performance characteristic values may be compared directly to a predetermined target value. For example, the further trigger may comprise an indication that a difference between: a detection performance characteristic value determined for the different selected one of the first and second neural networks (prior to the selection thereof); and a predetermined target value, has a predetermined relationship with a predetermined threshold value. For example, returning to the example above, the predetermined image including a cat and a car may have an associated predetermined target value of [0.0, 1.0, 1.0] corresponding to target probabilities of dog=0.0, cat=1.0, car=1.0. Thus, the difference between the second detection performance characteristic value of [0.75, 0.80, 0.85] and the predetermined target value of [0.0, 1.0, 1.0] may be determined as [−0.75, 0.20, 0.15]. This difference array may be compared to a predetermined threshold array in a similar way to that described above.

In other examples, respective differences between the determined detection performance characteristic values and the predetermined target value may be determined. For example, the further trigger may comprise an indication that a difference between: a detection performance characteristic value determined for the different selected one of the first and second neural networks (prior to the selection thereof); and a predetermined target value, has a predetermined relationship with a difference between: a detection performance characteristic value determined for the selected one of the first and second neural networks; and the predetermined target value. In the example above, the difference between the second detection performance characteristic value of [0.75, 0.80, 0.85] and the predetermined target value of [0.0, 1.0, 1.0] is determined as [−0.75, 0.20, 0.15]. Similarly, the difference between the first detection performance characteristic value of [0.80, 0.75, 0.85] and the predetermined target value of [0.0, 1.0, 1.0] may be determined as [−0.80, 0.25, 0.15]. In this example, the further trigger may comprise an indication that the difference between the second detection performance characteristic value and the predetermined target value (or components thereof) is (are) determined to be less than or equal to the difference between the first detection performance characteristic value and the predetermined target value (or components thereof), e.g. that the second detection performance characteristic value is closer to the predetermined target value than the first detection performance characteristic value. On the basis of this trigger, the processing of further image data may be switched to the second neural network, for example.

In some examples in which the predetermined image (for determining detection performance characteristic values) includes multiple objects, the further trigger may be based on a comparison between: an ordering of object classes by probability as determined by a given neural network; and a predetermined target ordering. For example, returning to the example above in which the predetermined image includes a cat object and a car object, the predetermined target ordering of object classes (from highest to lowest probability) may be: car; cat; other. The ordering of object classes (from highest to lowest probability) determined by the first neural network in this example, based on the first detection performance characteristic value of [0.80, 0.75, 0.85], is: car; dog; cat. The ordering of object classes determined by the second neural network in this example, based on the second detection performance characteristic value of [0.75, 0.80, 0.85], is: car; cat; dog. Thus, the ordering of object classes by probability determined by the second neural network is closer to the target ordering than the ordering by probability determined by the first neural network, which may trigger the switching of processing of further image data to the second neural network, for example.

In examples described above, the predetermined image processed by the first and second neural networks (to determine respective detection performance characteristic values therefor) is the same "known" image. In other examples, however, the first and second neural networks 100, 200 may each process a respective predetermined image for determining the corresponding detection performance characteristic value. For example, the first neural network 100 may process a first predetermined image and the second neural network 200 may process a second predetermined image. The first and second predetermined images may comprise frames n and n+k (where n and k are positive integers) in a stream of sequential image frames that are processed, for example. In some cases, k=1 such that the first and second image frames are consecutive. In other cases, k>1 such that the first and second image frames are not consecutive.

In examples in which the plurality of neural network systems includes one or more neural network systems in addition to the first and second neural network systems 100, 200, performance characteristic values may be determined respectively for each neural network system of the plurality of neural network systems. In such examples, the processing of further image data may be switched to the neural network system having the fewest layers that has a determined performance characteristic value within a predetermined tolerance of that determined for the neural network system last used to process image data.

In examples, the first neural network system 100 may be the selected one of the plurality of neural network systems to process the image data, e.g. on the basis of the obtained trigger. Prior to obtaining a further trigger, an object may be detected in the image using the first neural network system 100, but not detected as belonging to the class of objects. For example, the first neural network system 100 may be arranged to detect cats in images, and may detect an object of interest which does not belong to the class of cat. The further trigger, on the basis of which processing of image data is switched to a different neural network, may comprise an indication that the detected object does not belong to the class of objects, e.g. cat. Thus, the second neural network 200 may be selected to process subsequent image data.

In examples, the first plurality of layers 101, of the first neural network system 100, and the second plurality of layers 201, of the second neural network system 200, comprise at least one layer shared by both the first and second neural networks 100, 200.

Figure 3:
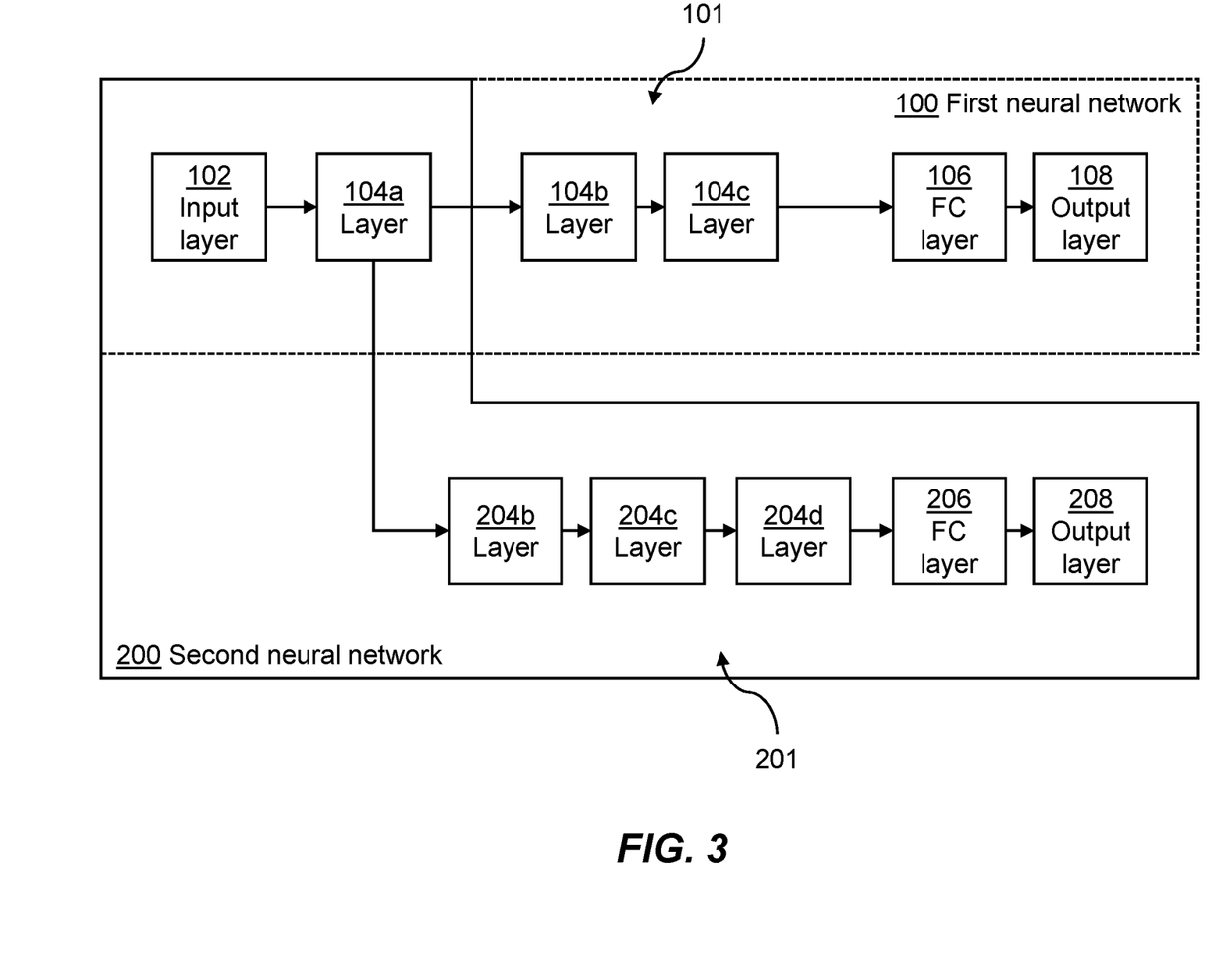

FIG. 3 shows an example in which the first neural network 100 and the second neural network 200 share the layer 104a (and input layer 102). Thus, the output of the shared layer 104a may be received as input by the layer 104b when the first neural network 100 is selected to process image data received as the input layer 102. Alternatively, when the second neural network 200 is selected to process said image data, the output of the shared layer 104a may be received as input by the layer 204b. In examples, the first and second neural networks 100, 200 share a plurality of layers.

The initial layers of a neural network may identify more general image features, which may be present in images of a wide range of different scenes or objects. Thus, two neural networks trained to identify cars in images, but of different complexities, may nevertheless have similar or identical initial layers, which identify general image features such as edges, corners, or ridges in the images. Subsequent layers in these neural networks may be different, however, in order to perform a higher level determination of whether lower-level image features correspond to a particular class of object (e.g. a car), depending on what the neural networks have been trained to detect. The more complex neural network may have more subsequent layers, more neurons and/or more interconnections between neurons, for example.

Thus, by sharing at least one such initial layer 104a, the first and second neural networks 100, 200 may as a whole store less weight data, corresponding to the weights associated with the at least one shared layer 104a, compared to implementing the respective initial layers 104a, 204a of the first and second neural networks 100, 200 separately, e.g. as in the example arrangement of FIG. 2.

Figure 4:
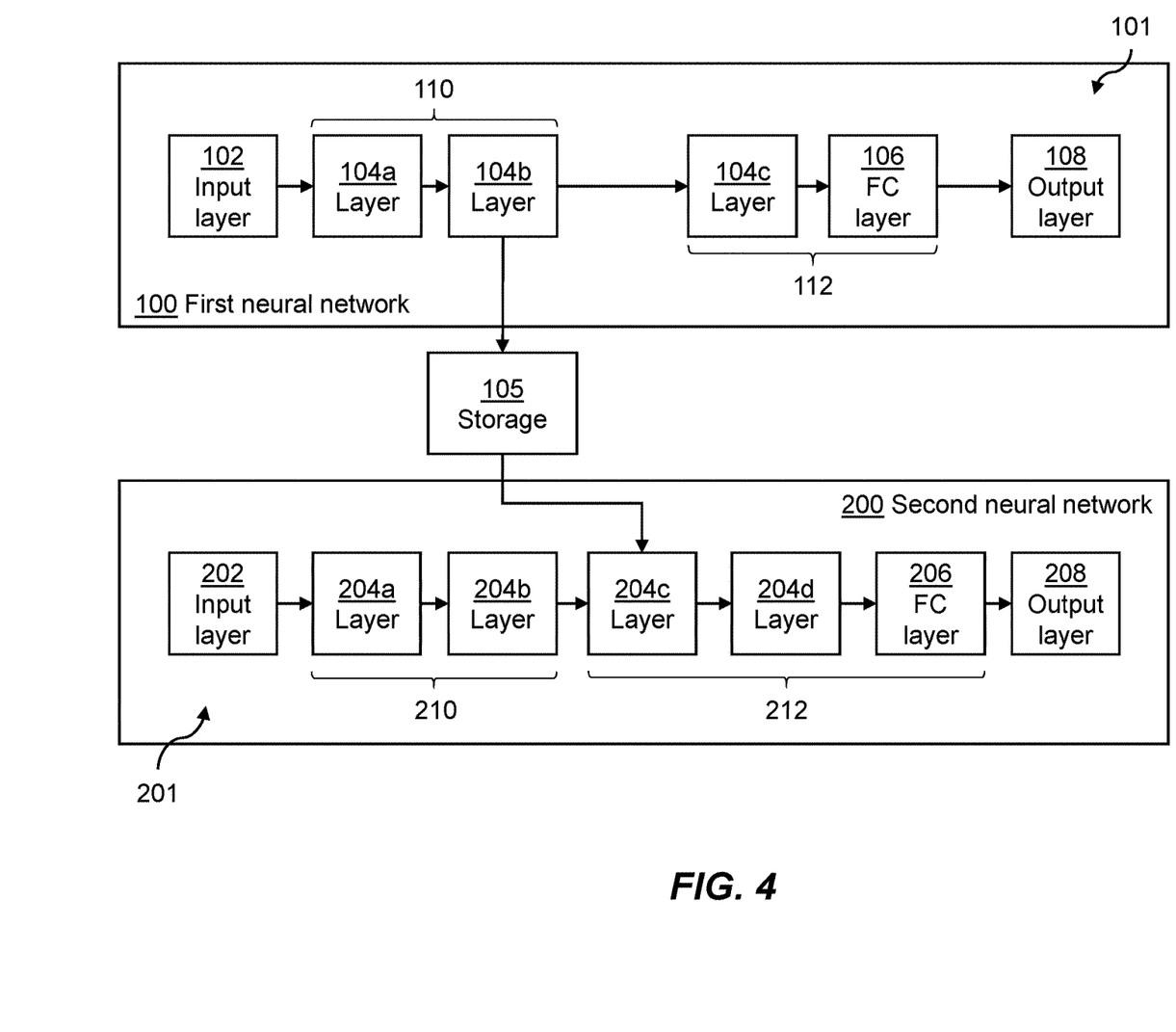

FIG. 4 shows an example where the first plurality of layer 101 of the first neural network includes a first subset of layers 110 arranged to process image data, received as the input layer 102, to generate feature data representative of at least one feature in the image represented by the image data. For example, the first two convolutional layers 104a, 104b of the first convolutional neural network 100 are part of the first subset 110 in this example. In some examples in which the first neural network 100 is a CNN, each layer of the first subset 110 may be a convolutional layer, as in FIG. 4.

As shown in FIG. 4, the first plurality of layers 101 also includes a second subset of layers 112 arranged to process the feature data, generated by the first subset of layers 110, to detect the class of objects in the image. In this example, the second subset 112 comprises the sole fully connected layer 106 of the first neural network 100. The third convolutional layer 104c of the first neural network 100 is also part of the second subset of layers 112 in the example of FIG. 4.

In some examples, at least one layer of the first subset 110 is shared by the second neural network 200, as described in examples above with reference to FIG. 3. For example, the first convolutional layer 104a in the first subset 110 of the first neural network may also be part of the second plurality of layers 201 such that data generated by the shared layer 104a is output to a subsequent layer of either the first neural network 100 or the second neural network 200, depending on which neural network is selected to process image data.

Referring to FIG. 4, in some examples the method 10 of processing image data includes, when processing the image data using the second neural network system, processing the image data using the first subset 110 of the first plurality of layers 101 to generate feature data, as described. The method 10 continues by transferring the feature data to a layer 204c of the second plurality of layers 201, as feature map data thereto, and processing the feature data using the layer 204c and further layers 204d, 206, of the second plurality of layers 201.

Therefore, in addition to transferring the feature data to additional layer(s) of the first neural network 100, the first neural network 100 of FIG. 4 is also arranged to transfer to the feature data to the second neural network 200. In this example, the feature data is output from the last layer 104b of the first subset of layers 110 in the first neural network 100 and written to storage 105. It may then be read from the storage 105 by the second neural network 100. This provides additional flexibility. For example, in other neural networks, feature data which may be generated during processing of image data by a neural network, for example at an intermediate stage, may not be written to storage. Instead, solely an output of the neural network may be written to storage. While this may reduce the number of write actions performed during use of the neural network (and the amount of storage required), this does not provide the flexibility of the multi-stage system shown in FIG. 4, in which the feature data may be read from the storage 105 and re-used as needed.

In the example of FIG. 4, the second neural network 200 includes an input layer 202 and a third subset of layers 210, wherein each layer 204a, 204b of the third subset 210 corresponds, respectively, to each layer 104a, 104b of the first subset 110 of the first plurality of layers 101. A correspondence between the third subset of layers 210 of the second neural network 200 and the first subset of layers 110 of the first neural network 100 may imply that each layer of the third subset 210 is identical to a corresponding layer of the first subset 110. For example, the weights associated with these layers may be the same as each other (where each entry of a kernel for example corresponds with a weight). Alternatively, each layer of the third subset 210 may be sufficiently similar to a corresponding layer of the first subset 110 in order to extract the same features as one another. For example, a weight difference between the weights associated with a layer of the first subset 110 and a corresponding layer of the third subset 210 may be less than a predetermined threshold amount.

In examples such as the one shown in FIG. 4, the first subset of layers 110 may be an initial at least one convolutional layer 104a, 104b of the first neural network 100, which for example corresponds with the earliest at least one layer of a series of convolutional layers 104a, 104b, 104c of the first neural network 100 through which input data may be sequentially processed.

In FIG. 2, the second neural network 200 is also a CNN and each layer of the third subset of layers 210 is a convolutional layer. In such cases, the third subset 210 may also be an initial at least one convolutional layer 204a, 204b of the second neural network 200. In this way, each of the first and third subsets of layers 110, 210 may correspond to the initial layers 104a, 104b; 204a, 204b of the first and second neural networks 100, 200 which are used to extract the same higher level features from an input image as each other.

Because of this overlap in function of the first subset 110 of the first neural network 100 and the third subset 210 of the second neural network 200, the third subset 210 may be bypassed during processing of an image that has already been at least partially processed by the first neural network 100. For example, the third subset 210 may be bypassed by transferring the feature data from the first subset 110 of the first neural network 100 to the fourth subset 212 of the second neural network 200, e.g. without transferring the feature data to the third subset 210 of the second neural network 200.

This is shown in FIG. 4, in which the feature data output from the layer 104b (which may be considered to be a final or last layer of the first subset 110) is written to storage 105 and is subsequently retrieved from the storage 105 by a fourth subset of layers 212 of the second neural network 200. The retrieval of the feature data from the storage 105 in such cases is therefore performed before the feature data is processed using the second neural network 200. As described further below, the storage 105 may be a main memory or a local memory of a processor configured to implement the first and/or second neural networks 100, 200. The feature data written to storage 105 may represent a feature map derived from an entirety of the image, or from a portion of the image, such as a portion identified as a region of interest.

With this approach, rather than redoing the same initial processing as performed by the first subset of layers 210 of the first neural network 100, the second neural network 200 may instead read the feature data output from the first subset 210 from the storage 105, which may be more efficient and may reduce the amount of processing performed by the second neural network 200 when selected to process the image data. Although the second neural network 200 of FIG. 4 is shown as including the third subset of layers 210 which correspond to the first subset of layers of the first neural network 100, in other examples, the third subset 210 may be omitted when the second neural network 200 is used for classification. For example, the second neural network 200 may be trained so that the third subset 210 corresponds to the first subset 110 of the first neural network 100. However, the third subset 210 may not necessarily be present in a processor or other system arranged to implement the second neural network 200. For example, such a processor or system may not include or access weight data corresponding to weights associated with the third subset 210 during implementation of the second neural network 200 for classification. In such cases, using the second neural network 200 as the selected neural network to process image data on the basis of the obtained trigger (or further trigger) may involve the first subset 110 of the first neural network 100 processing the input image data corresponding to the input layer 102 and transferring the generated feature data to the fourth subset 212, e.g. via the storage 105, for further processing.

In examples in accordance with FIG. 4, the first and second neural networks 100, 200 have been trained to perform object detection, for example to detect an object of a predetermined class in an input image. Object detection as performed by the second neural network 200 may be a more complex task than object detection as performed by the first neural network 100 due to the increased complexity of the second neural network 200 compared to the first neural network 100. The complexity of a neural network may be determined or assessed based on certain characteristics of the neural network such as the number of layers, the number of neurons and/or the number of interconnections between neurons.

As explained above, the second neural network 200 of FIG. 4 includes a fourth subset of layers 212, which receives the feature data from the first neural network 100, e.g. via storage 105. The fourth subset 212 is for example arranged to process the feature data to generate object data indicative of whether the second neural network 200 has detected the presence of an object of a predetermined class in the image represented by the image data. In some examples, the generated object data comprises identification data indicative of whether the image includes an instance of the object of the predetermined class. In FIG. 4, the fourth subset 212 of the second neural network 200 includes the convolutional layer 204c arranged to receive the feature data generated using the first neural network 100, e.g. from storage 105. The fourth subset 212 also includes a further convolutional layer 204d, a fully connected layer 206, and an output layer 208, although this is merely an illustrative example and other arrangements are possible.

In examples, when the second neural network 200 is selected for processing the image data on the basis of the trigger, the first neural network 100 may be used to process the image data first, with one or more feature maps generated during the processing being stored. For example, referring to FIG. 4, the layer 104b of the first neural network 100 is configured to output the generated feature data to storage 105. The object data generated by the fully connected layer 106 of the first neural network 100 may indicate that an object has been detected but not classified. For example, said object data may indicate the presence of an unidentified object in the image. In response to such an indication, the second neural network 200 may be used to process the image data by obtaining the feature data generated by the first neural network 100, and stored in the storage 105, and proceeding to process the feature data using further convolutional and/or fully connected layers to classify the object detected, but not classified, by the first neural network 100. For example, in FIG. 4, the first convolutional layer 204c of the fourth subset 212 may be configured to obtain the stored feature data from the storage 105 and process the feature data, outputting the resulting feature data to the further convolutional layer 204d which outputs further generated feature data to the fully connected layer 206 for classification.

With this approach, the extra layers of the second neural network 200 may only be used when the system is in a mode in which the second neural network 200 is selected to process the image data, and when the first neural network 100 detects an object but is unable to classify said object, e.g. above a predetermined probability threshold. Thus, the additional processing of the second neural network 200 may be used more efficiently compared to processing all image data with the second neural network 200 when it is selected based on the trigger. In cases where an object is not detected by the first neural network 100, the additional layers of the second neural network 200 may not be used to process the image (feature) data, and so the associated additional processing may be saved. Furthermore, in cases where an object is detected by the first neural network 100 and the additional layers of the second neural network 200 are used to process the stored feature data, the processing of the image data using the initial layers 204a, 204b of the second neural network 200 may be bypassed, which may also increase processing efficiency.

In examples, input image data representative of an input image is received and processed to segment the input image into a plurality of blocks. A block of the plurality of blocks for example corresponds to the image represented by the image data, which may be processed as described with reference to FIGS. 1 to 4. Each block may have a predetermined size, and may be considered to correspond to a tile of a larger image, such as the input image. The block may be any shape (not merely square or rectangular) and some blocks may be of a different shape and/or size than other blocks. The size of blocks may depend on the available processing capacity of an image processing system arranged to process the input image, or may be a fixed size. By dividing the input image into blocks, blocks which contain detected objects may be identified as regions of interest, for example, and may be subjected to further processing without processing of other blocks which do not contain detected objects (such as blocks of the image corresponding to a background of a scene, such as the sky or grass). This may reduce unnecessary processing of image data, by focusing resources on portions of the image that are more likely to contain objects of interest.

In such cases, the fourth subset 212 of the second neural network may process the blocks which correspond to a region of interest, e.g. a region of the image in which an object has been detected but not classified by the first neural network 100, and not the other blocks of the image. For example, the initial layer 204c of the fourth subset 212 may obtain and process the feature data generated by the first subset 110, and corresponding to the region of interest, but not the feature data corresponding to other blocks of the image. In this way, when the second neural network 200 is selected to process the image data, the feature data may be processed using the second neural network 200 in response to the first neural network identifying that the image includes an unclassified object.

In some examples, wherein the second neural network 200 is selected to process the image data, if the first neural network 100 determines that the image does not contain an object, the corresponding feature data may be discarded from the storage 105, e.g. to create space in the storage 105 for storing feature data of other images, or other blocks of the input image, which do include an object.

In some examples, the feature data is written to storage 105 before it is determined whether the image includes an object. This may occur because the feature data may be generated partway through detected the object, and before the first neural network 100 has reached a determination of whether the image includes an object.

In other examples, though, the feature data may be written to storage after it is determined that the image includes an object. For example, the feature data may be stored in a temporary storage area such as a buffer during determination of whether the image includes an object. Subsequently, the feature data may be written to other storage such as a cache, from which it may be retrieved rapidly by the second neural network 200. For example, the feature data may be written to storage 105 without writing further feature data to the storage 105, where the further feature data corresponds to a further block of a plurality of blocks of an input image which the first neural network has determined does not include an object.

Figure 5:
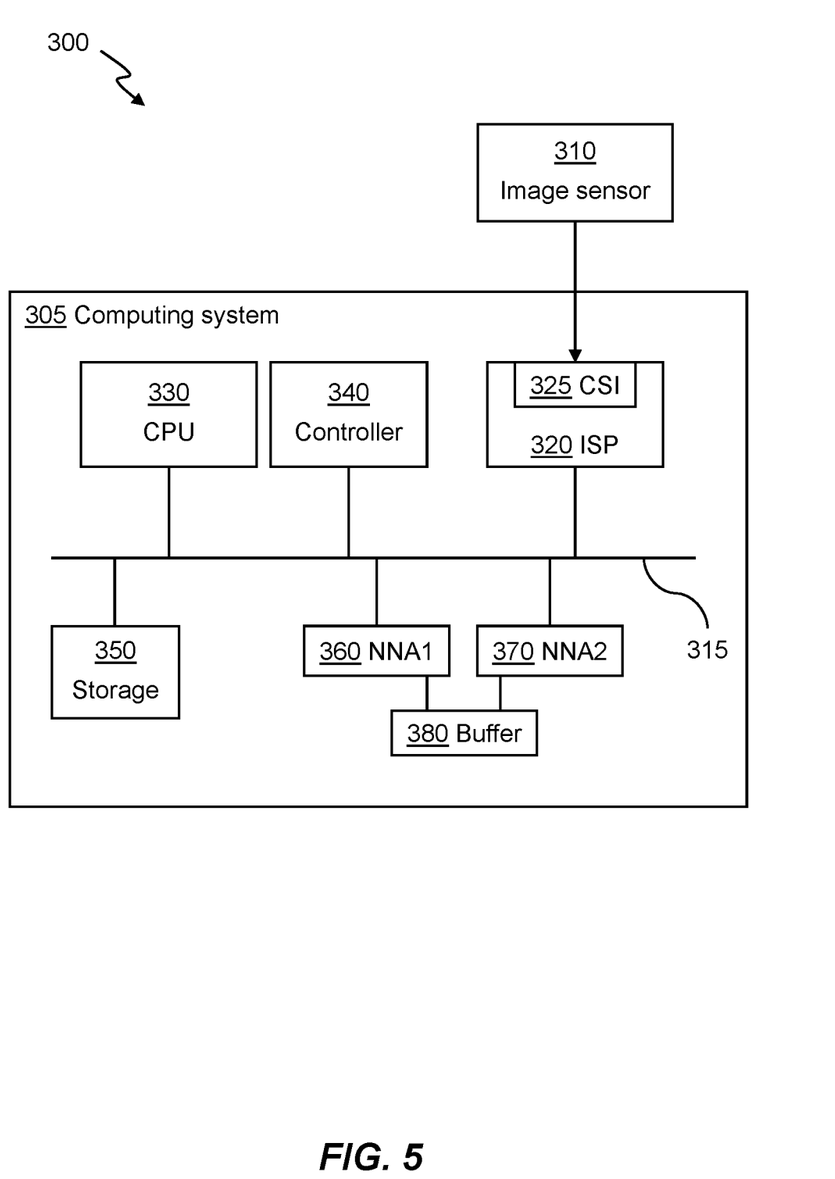
FIG. 5 shows schematically an example image processing system for use with the methods described herein.

An example of an image processing system 300 for use with the methods described herein is shown schematically in FIG. 5. The image processing system 300 of FIG. 5 may be coupled to or form part of a computer device, such as a personal computer, a laptop, a smartphone or an on-board computer device which may be coupled to or mounted within a vehicle such as a car.

The image processing system 300 of FIG. 5 includes an image sensor 310. An image sensor typically includes an array of sensor pixels, which may be any suitable photosensors for capturing images. For example, a typical sensor pixel includes a photosensitive element such as a photodiode that can convert incident light into electronic signals or data. The sensor pixel may for example be a charge-coupled device (CCD) or a complementary metal-oxide-semiconductor (CMOS). The image sensor 310 in this example is arranged to capture image data representative of an image. The image may form part of a video, which is typically a series of images captured sequentially. For example, the image may correspond to a frame of a video.

In FIG. 5, the image sensor 310 is arranged to transfer image data to an image signal processor (ISP) 320 of a computing system 305 via a camera serial interface (CSI) 325. The ISP 320 may perform initial processing of the image data to prepare the image data for display. For example, the ISP 320 may perform saturation correction, renormalization, white balance adjustment and/or demosaicing, although this is not to be taken as limiting. In other examples, the image processing system 300 may additionally or alternatively include a video decoder (e.g. implemented as part of a video conferencing system). For example, the image data to be processed may correspond to one or more frames of a video, e.g. received from the video decoder. The video may be captured by a video camera, e.g. as part of the video conferencing system or another networked system.

The computing system 305 of FIG. 5 includes at least one processor. In this example, the computing system 300 includes a central processor unit (CPU) 330. The computing system 305 also includes at least one neural network accelerator. A neural network accelerator is, for example, a processor dedicated to implementing at least classification of data using a neural network. For example, a neural network accelerator may be a processor dedicated to implementing at least classification of data using a neural network. The at least one neural network accelerator is configured to implement first and second neural networks such as those described above. The at least one neural network accelerator may be a neural network accelerator (such as a single or sole neural network accelerator) configured to implement both the first and second neural networks. However, in the example of FIG. 5, the at least one neural network includes a first neural network accelerator (NNA1) 360 and a second neural network accelerator (NNA2) 370. in the example of FIG. 5, the first neural network accelerator 360 is configured to implement a first neural network such as that described above, and the second neural network accelerator 370 is configured to implement a second neural network such as that described above.

In other examples, though, the computing system 305 may include other or alternative processors such as a microprocessor, a general purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. The computing system 305 may also or alternatively include a processor implemented as a combination of computing devices, e.g., a combination of a DSP and a microprocessor, a plurality of microprocessors, one or more microprocessors in conjunction with a DSP core, or any other such configuration. The computing system 305 may also or alternatively include at least one graphics processing unit (GPU). The first and/or second neural network may be implemented by one or more of these other processors in examples.

The computing system 305 of FIG. 5 includes a controller 340 configured to, in accordance with the methods described herein, obtain a trigger and, on the basis of the trigger, cause the at least one processor to process the image data using a selected one of the first and second neural network systems. The controller may comprise hardware and/or software to control or configure the plurality of neural networks. For example, the controller may be implemented at least in part by computer software stored in (non-transitory) memory and executable by the processor, or by hardware, or by a combination of tangibly stored software and hardware (and tangibly stored firmware). In some examples, the controller 340 includes a processor and a memory. Computer executable code that includes instructions for performing various operations of the controller described herein can be stored in the memory. For example, the functionality for controlling or interacting with the plurality of neural networks can be implemented as executable neural network control code stored in the memory and executed by the processor. As such, the executable code stored in the memory can include instructions for operations that when executed by processor cause the processor to implement the functionality described in reference to the example controller 340.

In other examples, the controller 340 may additionally or alternatively comprise a driver as part of the CPU 330. The driver may provide an interface between software configured to control or configure the neural networks and the at least one neural network accelerator which is configured to perform the processing to implement the neural networks. In other examples, though, a neural network may be implemented using a more general processor, such as the CPU or a GPU, as explained above. In addition to selecting the neural network to process the image data, as described herein, the controller 340 may be configured to control the transfer of the feature data from the first neural network to the second neural network as described in particular examples.

The computing system 305 of FIG. 5 also includes storage 350. The storage 350 is for example external to the at least one neural network accelerator, and in the example of FIG. 5 may be external to the first and second neural network accelerators 360, 370. The storage 350 may be a random access memory (RAM) such as DDR-SDRAM (double data rate synchronous dynamic random access memory). In other examples, the storage 350 may be or include a non-volatile memory such as Read Only Memory (ROM) or a solid state drive (SSD) such as Flash memory. The storage 350 in examples may include further storage devices, for example magnetic, optical or tape media, compact disc (CD), digital versatile disc (DVD) or other data storage media. The storage 350 may be removable or non-removable from the computing system 305. The storage 350 is for example arranged to store image data representative of at least part of an image, which may be received from the ISP 320. In some examples, the computing system 305 of FIG. 5 also includes a dynamic memory controller (DMC) which may be used to control access to the storage 350 of the computing system 305.

The components of the computing system 305 in the example of FIG. 5 are interconnected using a systems bus 315. This allows data to be transferred between the various components. The bus 315 may be, or include, any suitable interface or bus. For example, an ARM® Advanced Microcontroller Bus Architecture (AMBA®) interface, such as the Advanced eXtensible Interface (AXI), may be used.

In addition to the storage 350, which may be system storage or a main memory, the computing system 305 of FIG. 5 includes storage (in this example a buffer 380) which is accessible to the at least one processor configured to implement the plurality of neural networks, in this case to the first and second neural network accelerators 360, 370. For example, the first neural network accelerator 360 may be configured to write the feature data (described above) to the buffer 380, and the second neural network accelerator 370 may be configured to read the feature data from the buffer 380.

In the example of FIG. 5, the computing device 305 may be considered to include a neural network accelerator system including the first neural network accelerator 360 and the second neural network accelerator 370. In such examples, the buffer 380 may be considered to be local storage of the neural network accelerator system, which is accessible to the first and second neural network accelerators 360, 370. For example, the neural network accelerator system including the first and second neural network accelerators 360, 370 may be implemented in hardware, for example as a chip, and the buffer 380 may be on-chip memory. The buffer 380 may be a static random access memory (SRAM), for example, although other memory types are possible. In examples, the buffer 380 may be used to store weight data representative of weights corresponding to respective neurons in the different layers of the plurality of neural networks. Thus, in examples described above in which one or more layers are used by more than one neural network, e.g. the first and second neural networks, more weights may be stored in the buffer 380 (or whichever storage is used to store weight data) using the same amount of weight data than implementing the more than one neural network independently.

In other examples, the computing device 305 may not include such a buffer 380. In such cases, the first neural network accelerator 360 may be configured to write the feature data to the storage 350, which is for example a main memory. In such cases, the second neural network accelerator 370 may be configured to read the feature data from the storage 350.

In other examples in which a neural network accelerator is configured to implement both the first and second neural network, the neural network accelerator may, similarly to the first and second neural network accelerators 360, 270, include local storage. In such cases, the neural network accelerator may be configured to write the feature data to the local storage and read the feature data from the local storage. The local storage may be similar to the buffer 380 of FIG. 5. For example, where the neural network accelerator is implemented in hardware, for example as a chip, the local storage may be on-chip memory. The local storage may for example be a static random access memory (SRAM), although other memory types are possible). In other examples, though, the neural network accelerator may instead write the feature data to the storage 350.

The above examples are to be understood as illustrative examples. Further examples are envisaged. For example, although in examples described above the first and second neural networks are each CNNs, in other examples other types of neural network may be used as the first and/or second neural networks.

Furthermore, as described in examples, the image data processed using a neural network system selected from a plurality of neural network systems is representative of at least part of an image. In some examples, the image data comprises first image data representative of a first part of the image. Example methods include obtaining second image data representative of a second part of the image. For example, a whole image as captured by an image sensor or a whole video frame as captured by a video camera, may be obtained and partitioned into a plurality of image parts including the first and second parts of the image. The first part of the image may be processed using a selected one of the first and second neural network systems on the basis of an obtained trigger, in accordance with examples described herein. In some examples, the second image data is processed using a different selected one of the first and second neural network systems. For example, the second image data may be processed using the different selected neural network systems on the basis of the trigger, or a further trigger obtained. For example, the first and second parts of the image may be analyzed to determine respective detection performance characteristic values, in accordance with examples described above. It may be determined that a difference between first and second values of a detection performance characteristic, determined respectively for the first and second neural network systems processing the first part of the image, has a predetermined relationship with a predetermined threshold value. This may trigger processing the first image data, or further image data corresponding to a respective first part of a further image, using the second neural network system, for example, as described herein. It may also be determined that a difference between first and second values of a detection performance characteristic, determined respectively for the first and second neural network systems processing the second part of the image, has a different predetermined relationship with the predetermined threshold value. This may trigger processing the second image data, or further image data corresponding to a respective second part of a further image, using the first neural network system. For example, it may be indicated that object detection in the second part of the image can be performed comparably well by the first and second neural networks, e.g. based on comparing the corresponding detection performance characteristic values determined for the second part of the image. Thus, corresponding second parts of further images may be processed using the second neural network, whereas corresponding first parts of said further images may be processed using the first neural network.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A method of processing image data representative of at least part of an image using a computing system to detect at least one class of object in the image, the method comprising:
receiving the image data;
obtaining a trigger;
on the basis of the trigger, selecting between processing the image data using a first neural network system and processing the image data using a second neural network system; and
processing the image data using the selected neural network system, wherein:
the first neural network system is arranged to detect a class of objects, the first neural network system comprising a first plurality of layers; and
the second neural network system is arranged to detect the class of objects, the second neural network system comprising a second plurality of layers,
wherein the second neural network system has at least one of:
more layers than the first neural network system;
more neurons than the first neural network system; and
more interconnections between neurons than the first neural network system, and
wherein the method comprises, subsequent to processing the image data using the selected one of the first and second neural network systems;
obtaining a further trigger, different from the aforementioned trigger; and
on the basis of the further trigger, switching processing of further image data to a different selected neural network system,
wherein the further trigger comprises an indication that a difference between first and second values of a detection performance characteristic, determined respectively for the first and second neural network systems, has a predetermined relationship with a predetermined threshold value, and the detection performance characteristic, determined for a given neural network system, corresponds to a probability that a predetermined image comprises an object belonging to a predetermined class of objects, the probability being determined by the given neural network based on image data representative of the predetermined image.

2. The method according to claim 1, wherein the trigger comprises an indication that a value representative of an availability of a system resource of the computing system has a predetermined relationship with a respective predetermined threshold value for the system resource.

3. The method according to claim 1 comprising:
determining, prior to the processing of the image data, a value of a detection performance characteristic for the selected one of the first and second neural network systems; and
on the basis of the detection performance characteristic value having a predetermined relationship with a predetermined threshold value, processing the image data.

4. The method according to claim 3, wherein the detection performance characteristic corresponds to a probability, determined by the selected one of the first and second neural network systems based on image data representative of a predetermined image, that the predetermined image comprises an object belonging to a predetermined class of objects.

5. The method according to claim 1, wherein the method comprises periodically determining and comparing respective values of the classification performance characteristic for the first and second neural network systems.

6. The method according to claim 1, wherein the selected neural network system comprises the first neural network system, the method comprising, prior to obtaining the further trigger, detecting an object in the image using the first neural network system,
wherein the further trigger comprises an indication that the detected object does not belong to the class of objects.

7. The method according to claim 1, wherein the image data comprises first image data representative of a first part of the image, the method comprising:
obtaining second image data representative of a second part of the image; and
processing the second image data using a different selected one of the first and second neural network systems.

8. The method according to claim 1, wherein the first plurality of layers comprises:
a first subset arranged to process the image data to generate feature data representative of at least one feature in the image; and
a second subset arranged to process the feature data to detect the class of objects.

9. The method according to claim 8, wherein at least one layer of the first subset is shared by the second neural network.

10. The method according to claim 8, wherein the first neural network comprises a convolutional neural network, each layer of the first subset is a convolutional layer, and the second subset comprises a fully connected layer.

11. The method according to claim 8, the method comprising, when processing the image data using the second neural network system:
processing the image data using the first subset of the first plurality of layers to generate the feature data;
transferring the feature data to a layer of the second plurality of layers as feature map data thereto; and
processing the feature data using the layer and further layers of the second plurality of layers.

12. The method according to claim 11, wherein the second plurality of layers comprises:
- a third subset, wherein each layer of the third subset corresponds, respectively, to each layer of the first subset of the first plurality of layers; and
- a fourth subset comprising the layer and the further layers of the second plurality of layers.

13. The method according to claim 12, wherein the second neural network comprises a convolutional neural network, each layer of the third subset is a convolutional layer, and the fourth subset comprises a fully connected layer.

14. The method according to claim 1, wherein the trigger is obtained prior to processing the image data.

15. The method according to claim 2, wherein the availability of the system resource comprises:
- a state of charge of an electric battery configured to power the computing system;
- an amount of available storage accessible by the computing system;
- an amount of processor usage available to the computing system;
- an amount of electrical power available to the computing system; or
- an amount of bandwidth available to at least one processor configured to implement at least one of the first and second neural network systems.

16. The method according to claim 1, wherein the trigger comprises an indication that a value representative of a temperature of the computing system has a predetermined relationship with a respective predetermined threshold temperature value.

17. The method according to claim 1, wherein the trigger comprises an indication that a value representative of a latency of generating object data by a neural network system selected from the plurality of neural network systems, the object data indicative of whether a given image includes an object of the class of objects, has a predetermined relationship with a respective predetermined threshold latency value.

18. An image processing system comprising:
- at least one processor configured to implement a plurality of neural network systems including a first neural network system and a second neural network system; and
- storage accessible by the at least one processor, the storage configured to store image data representative of at least part of an image; and
- a controller configured to:
  obtain a trigger; and
  on the basis of the trigger, cause the at least one processor to select between processing the image data using the first neural network system and processing the image data using the second neural network system, wherein:
    the first neural network system is arranged to detect a class of objects and comprising a first plurality of layers; and
    the second neural network system is arranged to detect the class of objects and comprising a second plurality of layers, and
  wherein the second neural network system has at least one of:
    more layers than the first neural network system;
    more neurons than the first neural network system; and
    more interconnections between neurons than the first neural network system, and
  wherein the method comprises, subsequent to processing the image data using the selected one of the first and second neural network systems;
  obtaining a further trigger, different from the aforementioned trigger; and
  on the basis of the further trigger, switching processing of further image data to a different selected neural network system,
  wherein the further trigger comprises an indication that a difference between first and second values of a detection performance characteristic, determined respectively for the first and second neural network systems, has a predetermined relationship with a predetermined threshold value, and the detection performance characteristic, determined for a given neural network system, corresponds to a probability that a predetermined image comprises an object belonging to a predetermined class of objects, the probability being determined by the given neural network based on image data representative of the predetermined image.

19. The image processing system according to claim 18, wherein the controller is configured to obtain the trigger prior to causing the at least one processor to process the image data using a selected one of the first and second neural network systems.

* * * * *